No. 619,764. Patented Feb. 21, 1899.
A. LATHAM.
CASH REGISTER.
(Application filed Dec. 21, 1897.)
(No Model.) 3 Sheets—Sheet 1.
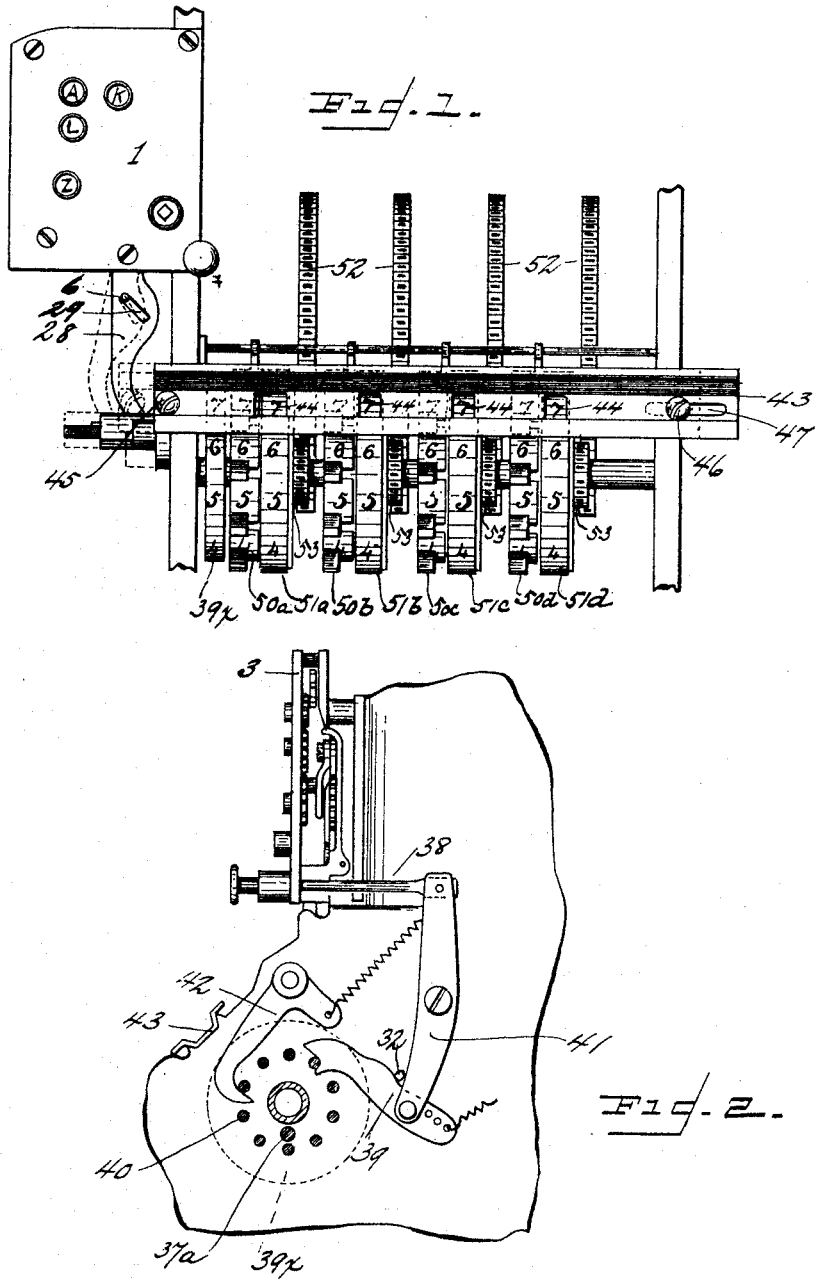

No. 619,764. Patented Feb. 21, 1899.
A. LATHAM.
CASH REGISTER.
(Application filed Dec. 21, 1897.)
(No Model.) 3 Sheets—Sheet 2.

WITNESSES
INVENTOR
Albert Latham
George A. Huntington
Attorney

No. 619,764. Patented Feb. 21, 1899.
A. LATHAM.
CASH REGISTER.
(Application filed Dec. 21, 1897.)
(No Model.) 3 Sheets—Sheet 3.

WITNESSES: Wm. T. Bell. Robert J. Pollitt.

INVENTOR Albert Latham BY George H. Huntington ATTORNEY

UNITED STATES PATENT OFFICE.

ALBERT LATHAM, OF SPRINGFIELD, MASSACHUSETTS.

CASH-REGISTER.

SPECIFICATION forming part of Letters Patent No. 619,764, dated February 21, 1899.

Application filed December 21, 1897. Serial No. 662,863. (No model.)

*To all whom it may concern:*

Be it known that I, ALBERT LATHAM, a citizen of the United States, residing in the city of Springfield, county of Hampden, and State of Massachusetts, have invented a new and useful Improvement in Cash-Registers, of which the following is a specification.

My invention relates to cash-registers in which rotating indicators are employed as the means for effecting the desired registration, said indicators consisting of pairs of wheels and each pair comprising an adding-wheel and an indicating-wheel, the former being for the use of the proprietor in ascertaining the sum total which the machine has registered in a given length of time and the latter being for the benefit of the operator in indicating the amount of each sale made.

In a copending application, filed December 8, 1897, I refer to a certain totalizing-wheel which is for the use of the proprietor in ascertaining approximately the amount—in hundreds of dollars, for instance—registered. This wheel is actuated automatically, as are the other adding-wheels; but for the use of the proprietor it is desirable that it be provided with hand-operating resetting mechanism. It is also desirable that when reset it may not only be locked against manipulation by its hand operating means, but also against automatic actuation past a point corresponding to its highest index. Furthermore, in cash-registers of the kind now being referred to it is customary to use a perforated slide or blind which is reciprocatorily arranged in front of the pairs of wheels, so that in one position thereof a numeral on one of the wheels in each pair is exposed to view and in the other position thereof a numeral on the other of said wheels in each pair may be seen.

My present invention has for its object the provision of a hand operating mechanism and also means for simultaneously locking the totalizing-wheel against both automatic actuation past a certain point and hand actuation and operating the slide or blind mentioned above.

Figure 3:
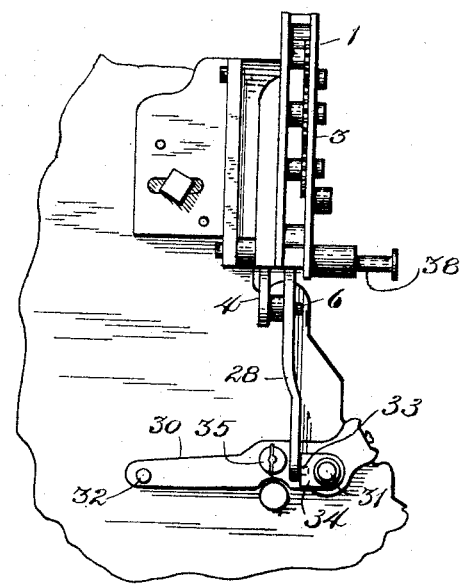
Figure 4:
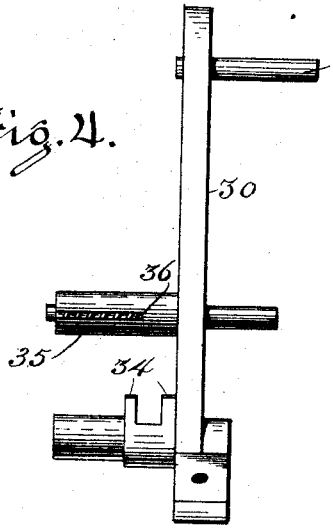
Figure 5:
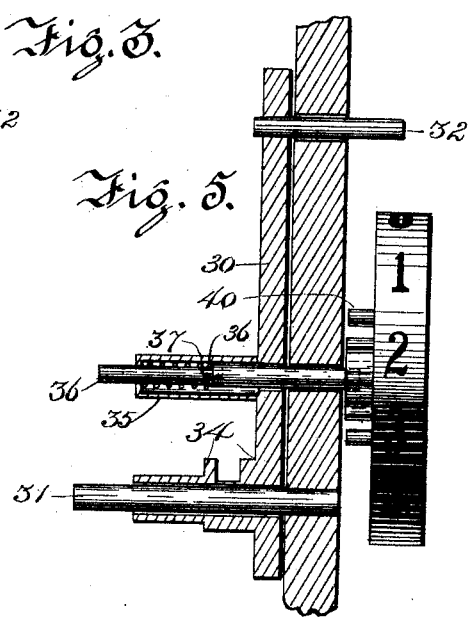
Figure 6:
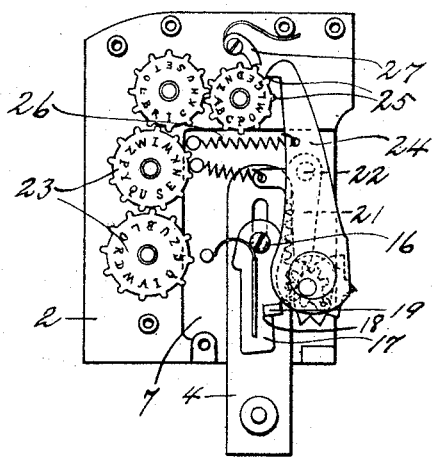
Figure 7:
Figure 8:
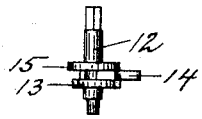
Figure 9:
Figure 11:
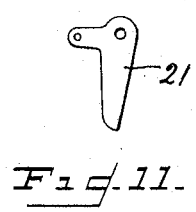
Figure 10:
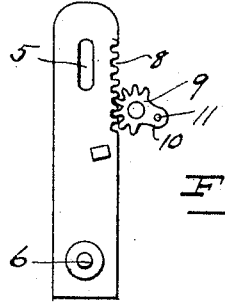

In the accompanying drawings, Figure 1 is a front elevation of a portion of a cash-register provided with a blind for the wheels, with locking mechanism for the totalizing-wheel, and with means for simultaneously reciprocating the blind and operating the locking mechanism. Fig. 2 is a view of a portion of the inner face of a side piece of the frame of the machine, showing the relative positions of my locking mechanism, its operating means, and the hand operating device for the totalizing-wheel. Fig. 3 is a view of the outer face of a portion of said side piece, showing my locking mechanism and its operating means in position. Fig. 4 is a top plan view of a bracket which constitutes said locking mechanism and by which the slide is operated. Fig. 5 is a horizontal sectional view of that much of my invention as is shown in Fig. 4. Fig. 6 is an enlarged detail view of the operating means for the locking mechanism with its front plate removed, and Figs. 7, 8, 9, 10, and 11 are detail views of parts of the internal mechanism of said operating means shown in Fig. 6.

In said drawings, 1 represents the device by which the locking mechanism is manipulated and the blind reciprocated and which is adapted to present through apertures in its front face a different combination of letters or numerals each time these operations are effected thereby. This device may be thus described. In a frame or case 2, provided with a front plate 3, is arranged a reciprocating or slide bar 4, having an elongated longitudinal slot 5 at its upper end and a pintle 6 at its lower end. Said slide-bar is set into a recess 7 in the case or frame and protrudes through the bottom wall thereof. It is provided with rack 8 on one side thereof, with whose teeth the teeth of a half-pinion 9, journaled close to said bar, are adapted to intermesh. Said half-pinion 9 is provided with a peripheral projection 10, which carries an upright pin 11. Arranged above said half-pinion—that is to say, with said half-pinion next the plate—upon a common axis 12 therewith, which axis is squared at its upper end to form a key-post, is journaled in the frame at its lower end, and also constitutes the journal for the half-pinion, are a cam 13, a mutilated ratchet-wheel 14, and an eccentric 15, all integrally formed and rigidly mounted on said axis. The cam 13 is adapted to operate the half-pinion, and for this purpose it is provided with a pair of spaced peripheral projections *a b*, each of which comes into contact with the pin 11, and thereby moves said half-pinion whenever the cam is turned far enough in either direction. The slot in the upper end of the slide-bar 4 is penetrated by a screw 16, the upper end of which forms a fulcrum for a spring-actuated lever 17, having a recess 18 in the edge thereof nearest the cam 13, which recess is adapted to receive a lug 19, mounted upon the upper face of said bar. The lug is adapted to assume a position either in the recess of said lever or at the end thereof, in either of which positions, as is obvious, the lever locks the bar from reciprocating; but when the cam 13 is revolved its periphery first wipes upon the edge of the lever, so as to displace the same from engagement with the lug, and then its projection $a$ engages the pin on the half-pinion, so as to turn the latter and move the bar. In moving said bar in the other direction the operation is of course reversed.

The teeth of the mutilated ratchet-wheel are engaged by the end of a spring-actuated pawl 21, fulcrumed at 22 in the frame. The shape of the end of this pawl is such that it will not permit the rotation of the ratchet-wheel in one direction until a complete rotation in the other direction has been effected. At the completion of a turn of the ratchet-wheel to the right the pawl is thrown into position for wiping on the teeth of said wheel in the return rotation thereof to the left by means of the first tooth, and at the completion of the turn of said wheel to the left the spring of said pawl causes the same to snap past the last tooth of the wheel into proper position for wiping upon the teeth of the wheel when the latter is again rotated toward the right.

A series of star-wheels 23 of different sizes and provided with numerals or letters on their upper faces that are adapted to show through suitable apertures in the face-plate of the frame and thus present different combinations are journaled in the frame and receive their movement from a hook-pawl 24, which engages ratchet-teeth 25, arranged on the first star-wheel, and which has bearings in and is reciprocated by the eccentric 15. A spring 26 holds the hook-pawl in contact with the ratchet-wheel of said first star-wheel, and a spring-actuated pawl 27 prevents backward rotation of the same.

A suitable key formed to fit the key-stem of the axis is used for operating the slide-bar.

Pivoted to the front plate of the mechanism which I have just described and contiguous to the protruding end of the slide-bar 4 is a depending lever 28, provided with a cam or inclined slot 29, in which works the pintle 6 on the lower end of said slide-bar. By this arrangement the vertical operation of the slide-bar produces lateral vibration of the lever 28 to and from the side piece of the machine-frame. 30 is a bracket adapted to be reciprocated by said lever to and from the side piece of the machine-frame upon a stem 31, projecting from the latter, and a pin 32, formed on the bracket and extending through the side piece in which it has its bearings. The lower end of the lever is provided with a pin 33, which is arranged between two lugs 34, so that a sliding joint between the lever and the bracket is provided. The bracket is provided with a laterally-extending split sleeve 35, carrying a stop-pin 36, adapted to slide therein and to project through an aperture provided in the side piece of the frame when the bracket is in the position close to said side piece. The split sleeve incloses a spring which normally presses against trunnions 37, formed on said stop-pin and sliding in the slits of said sleeve to normally hold the stop-pin inwardly toward the side piece. On the inside of said side piece is journaled the wheel which I have described and claimed in my copending application hereinbefore referred to and which I have therein designated a "totalizing-wheel." This wheel (designated by the reference-numeral $39^\times$) is shown in full lines in Fig. 1 and in dotted lines in Fig. 2.

The indicating and adding wheels are arranged in pairs, one of each kind in each pair, and they are designated by the numerals $50^a$ $50^b$ $50^c$ $50^d$ and $51^a$ $51^b$ $51^c$ $51^d$, respectively. Each indicating-wheel is connected with suitable actuating means, and it is also operatively connected with the adding-wheel adjoining, so as to carry the latter forward with itself, but to be susceptible of rearwardly rotating independent of said adding-wheel, which is held against backward rotation. The operating means for each indicating-wheel consists of a suitable driving-segment 52 and a pinion 53 in mesh therewith and carried by said indicating-wheel. Said totalizing-wheel constitutes a supplemental adding-wheel, and, as above stated, in Fig. 2 is operatively connected with the adding-wheel of highest order, so as to be partially rotated to show one of its indices at each rotation of said adding-wheel. Said totalizing-wheel carries on its outer face a pin $37^a$, adapted to be engaged by the stop-pin 36, which, as heretofore pointed out, is made yielding, so that should the bracket be moved toward the side piece when the stop-pin and the pin $37^a$ are in alinement the movement will not be hindered. Besides the automatic means for operating said totalizing-wheel just referred to operative connection with a series of levers is provided, so that it may be rotated by hand. The system of levers referred to consist of a push-rod 38, having a knob at its outer end, a spring-actuated trip-toe 39, notched at one of its ends to engage a series of ten pins 40, equidistantly arranged on the face of the totalizing-wheel nearer to the side piece of the frame, and a lever 41, fulcrumed in said side piece and connecting the free ends of the push-rod and the trip-toe. A pawl 42 also engages the pins to prevent the backward rotation of the totalizing-wheel, and said pawl is connected by a suitable spiral spring with the end of the lever 41. The pin 32 of the bracket penetrates the frame above the trip-toe, so as to thus lock the hand operating means for the totalizing-wheel when the bracket is in proximity to the said frame. The blind consists of an elongated laterally-reciprocating metal plate 43, spanning the two side pieces of the frame in front of the pairs of registration-wheels and provided with apertures 44 of such size and so arranged that in either of the extreme positions of the blind only one of the wheels in each pair can be read at a time. The aperture at the extreme right will permit the exposure of the totalizing-wheel as well as the adding-wheel adjoining the same of highest order, however. Said blind is connected to the bracket at one end by a screw 45 and to the side piece of the frame at the other side of the machine by another screw 46, which works in a slot 47 at the end of said plate or blind. Assuming the bracket to have been previously moved away from the side piece by turning the key in the device for operating said bracket, so as to move the slide-bar downwardly and vibrate the lever depending from said device, a subsequent turn of the key in an opposite direction will of course draw the bar upwardly and move the bracket toward the side piece through the consequent vibration of the lever, as is obvious. In this position the pin, which projects through a hole in the side piece situated just above the trip-toe 39 in the normal position thereof, will prevent actuation of the hand operating mechanism for the totalizing-wheel. At the same time the stop-pin 36, which projects through an aperture directly opposite to the path of the pin 19 on the side of the totalizing-wheel, takes a position in the path of said pin 19 and prevents the further rotation of the totalizing-wheel after it has reached a certain point. The reciprocation of the bracket causes a lateral movement of the blind 8, which it operates, so that either the indicating or the adding wheels may be read, according as either is exposed.

When it is considered that it is desirable to lock the totalizing-wheel, as described, so that it can in no way be manipulated past its highest numeral to present a lower one, and that it is also desirable to shut off the view of the operator from the adding-wheels by the blind 3, the advantages of simultaneously performing these two operations by means of the same mechanism will appear.

Having thus fully described my invention, what I claim, and desire to secure by Letters Patent of the United States, is—

1. In a cash-register, the combination with the frame, of series of adding and indicating wheels journaled in said frame, the series of adding-wheels including a totalizing-wheel, means for operating said series of wheels, a blind for exposing one and hiding the other of said series of wheels, and means for locking the totalizing-wheel and operating said blind, substantially as described.

2. In a cash-register, the combination with the frame, of alternate adding and indicating wheels journaled in said frame and arranged in horizontal series, the series of adding-wheels including a totalizing-wheel, means for operating said series of wheels, a laterally-reciprocating perforated blind arranged in front of said series of wheels, and means for simultaneously locking the totalizing-wheel and operating the blind, substantially as described.

3. In a cash-register, the combination with the frame, of alternate adding and indicating wheels journaled in said frame and arranged in horizontal series, the series of adding-wheels including a totalizing-wheel, means for operating said series of wheels, a laterally-reciprocating perforated blind arranged in front of said series of wheels, and a laterally-reciprocating bracket mounted in said frame and adapted to lock said totalizing-wheel and having operative connection with said blind, substantially as described.

4. In a cash-register, the combination with the frame, of alternate adding and indicating wheels journaled in said frame and arranged in horizontal series, the series of adding-wheels including a totalizing-wheel, means for operating said series of wheels, a pin projecting from the side of said totalizing-wheel, a laterally-reciprocating perforated blind arranged in front of said series of wheels, a laterally-reciprocating bracket mounted on said frame, a stop-pin carried thereby and adapted to engage the pin on said totalizing-wheel, said bracket being operatively connected with said blind, and means for operating said bracket, substantially as described.

5. In a cash-register, the combination with the frame, of alternate adding and indicating wheels journaled in said frame and arranged in horizontal series, the series of adding-wheels including a totalizing-wheel, means for operating said series of wheels, a pin projecting from the outer side of said totalizing-wheel, a laterally-reciprocating perforated blind arranged in front of said series of wheels, a laterally-reciprocating bracket mounted on said frame, a yielding stop-pin carried thereby and adapted to engage the pin on said totalizing-wheel, said bracket being operatively connected with said blind, and means for operating said bracket, substantially as described.

6. In a cash-register, the combination with the frame, of alternate adding and indicating wheels journaled in said frame and arranged in horizontal series, the series of adding-wheels including a totalizing-wheel, means for operating said series of wheels, a pin projecting from the outer side of said totalizing-wheel, a laterally-reciprocating perforated blind arranged in front of said series of wheels, a laterally-reciprocating bracket mounted on said frame, a yielding stop-pin carried thereby and adapted to engage the pin on the totalizing-wheel, said bracket being operatively connected with said blind, means for operating said bracket also mounted in said frame, and a lever operatively connecting said operating means for the bracket and said bracket, substantially as described.

7. In a cash-register, the combination with the frame, of alternate adding and indicating wheels journaled in said frame and arranged in horizontal series, the series of adding-wheels including a totalizing-wheel, means for operating said series of wheels, a series of pins and a single pin projecting from the outer side of said totalizing-wheel, a laterally-reciprocating bracket mounted on said frame, a yielding stop-pin carried thereby and adapted to penetrate the frame in the path of the single pin on said totalizing-wheel, a spring-actuated trip-toe engaging said series of pins, means for operating said trip-toe, a pin projecting from said bracket and penetrating the frame above said trip-toe, a laterally-reciprocating perforated blind arranged in front of said series of wheels, said blind being operatively connected with said bracket, and means for operating said bracket, substantially as described.

8. In a cash-register, the combination with the frame, a blind, a totalizing-wheel and a laterally-reciprocating bracket mounted on said frame and adapted to lock the totalizing-wheel and operate the blind of said cash-register, of a laterally-vibrating lever operatively connected to said bracket, a vertically-reciprocating slide-bar operatively connected to said lever and means for operating said slide-bar, substantially as described.

9. In a cash-register, the combination with the frame, a blind, a totalizing-wheel and a laterally-reciprocating bracket mounted on said frame and adapted to lock the totalizing-wheel and operate the blind of said cash-register, of a laterally-vibrating lever pivotally connected to said bracket and provided with an inclined slot, a vertically-reciprocating slide-bar provided with a pintle engaging said inclined slot in the lever, and means for operating said slide-bar, substantially as described.

10. In a cash-register, the combination with the frame and with a case mounted on said frame, of a laterally-vibrating lever fulcrumed in said case, and provided with an inclined slot, a vertically-reciprocating slide-bar also mounted in said case and provided at its lower end with a pintle engaging said slot in the lever, rack-teeth on the side of said slide-bar, a pinion engaging said rack-teeth and means for operating said pinion, substantially as described.

11. In a cash-register, the combination with the frame and with a case mounted thereon, of a laterally-vibrating lever fulcrumed in said case and provided with an inclined slot, a vertically-reciprocating slide-bar mounted in said case and provided with a pintle at its lower end engaging said slot in the lever, rack-teeth on the side of said slide-bar, a pinion engaging said rack-teeth, means for operating said pinion and means for positively securing said slide-bar at either of the limits of its movements, substantially as described.

12. In a cash-register, the combination with the frame and with a case mounted thereon, of a laterally-vibrating lever fulcrumed in said case and provided with an inclined slot, a vertically-reciprocating slide-bar also mounted in said case and provided with a pintle at its lower end engaging said slot in the lever, a lug on its upper face and rack-teeth on one of its sides, a pinion engaging said rack-teeth, a notched spring-actuated lever fulcrumed above said slide-bar, said lug being adapted to engage the end of and the notch in said spring-actuated lever, and means for disengaging said spring-actuated lever and operating said pinion, substantially as described.

13. In a cash-register, the combination with the frame and with a case mounted thereon, of a laterally-vibrating lever fulcrumed in said case and provided with an inclined slot, a vertically-reciprocating slide-bar also mounted in said case and provided with a pintle at its lower end engaging said slot in the lever, a lug on its upper face and rack-teeth on one of its sides, a pinion engaging said rack-teeth, and having a pin on its upper face, a notched spring-actuated lever fulcrumed above said slide-bar, said lug being adapted to engage the end of and the notch in said spring-actuated lever, a cam adapted to engage said spring-actuated lever and provided with peripheral projections adapted to engage the pin on said pinion, and means for operating said cam, substantially as described.

14. In a cash-register, the combination with the frame and with a case mounted thereon, of a laterally-vibrating lever fulcrumed in said case and provided with an inclined slot, a vertically-reciprocating slide-bar also mounted in said case and provided with a pintle at its lower end engaging said slot in the lever, a lug on its upper face and rack-teeth on one of its sides, a key-stem journaled in said case, a pinion having bearings on said key-stem, engaging said rack-teeth and having a pin on its upper face, a notched spring-actuated lever fulcrumed above said slide-bar, said lug being adapted to engage the end of and the notch in said lever, a cam rigidly mounted on said key-stem and adapted to engage said spring-actuated lever and provided with peripheral projections adapted to engage the pin on said pinion, a mutilated ratchet also rigidly mounted on said key-stem, a spring-actuated pawl engaging said mutilated ratchet, and means for operating said key-stem, substantially as described.

15. In a cash-register, the combination with the frame and with a case mounted thereon, of a laterally-vibrating lever fulcrumed in said case and provided with an inclined slot, a vertically-reciprocating slide-bar also mounted lug on its upper face and rack-teeth on one of its sides, a key-stem journaled in said case, a pinion having bearings on said key-stem, engaging said rack-teeth and having a pin on its upper face, a notched spring-actuated lever fulcrumed above said slide-bar, said lug being adapted to engage the end of and the notch in said spring-actuated lever, a cam rigidly mounted on said key-stem and adapted to engage said spring-actuated lever and provided with peripheral projections adapted to engage the pin on said pinion, a mutilated ratchet also rigidly mounted on said key-stem, a spring-actuated pawl engaging said mutilated ratchet, an eccentric rigidly mounted on said key-stem, a series of intermeshing star-wheels having bearings in said case and provided with indices, operative connection between said series of star-wheels and the eccentric and means for operating said key-stem, substantially as described.

16. In a cash-register, the combination with the frame and with a case mounted thereon, of a laterally-vibrating lever fulcrumed in said case and provided with an inclined slot, a vertically-reciprocating slide-bar also mounted in said case and provided with a pintle at its lower end engaging said slot in the lever, a lug on its upper face and rack-teeth on one of its sides, a key-stem journaled in said case, a pinion having bearings on said key-stem, engaging said rack-teeth and having a pin on its upper face, a notched spring-actuated lever fulcrumed above said slide-bar, said lug being adapted to engage the end of and the notch in said spring-actuated lever and provided with peripheral projections adapted to engage the pin on said pinion, a mutilated ratchet also rigidly mounted on said key-stem, a spring-actuated pawl engaging said mutilated ratchet, an eccentric rigidly mounted on said key-stem, a series of intermeshing star-wheels having bearings in said case and provided with indices, a ratchet-wheel integrally formed with one of said star-wheels, a spring-actuated hook-pawl pivotally connected to and operated by said eccentric and engaging said ratchet, another spring-actuated pawl engaging said ratchet-wheel, and a key for operating said key-stem, substantially as described.

17. In a cash-register, the combination with the frame, of an adding-wheel provided with a concentric series of pins, a lever fulcrumed in said frame, a trip-toe pivotally connected to one end of said lever and engaging said pins to operate said wheel, a guided push-rod pivotally connected to the other end of said lever, a pawl pivotally mounted in said frame and also engaging said pins, and springs, one connecting said trip-toe and the frame and the other connecting the pawl and the lever, substantially as described.

In testimony that I claim the foregoing specification I have hereunto set my hand this 26th day of August, 1897.

ALBERT LATHAM.

In presence of—
C. L. MALCOLM,
J. H. BELL.